United States Patent [19]

Belk

[11] Patent Number: 5,698,848
[45] Date of Patent: Dec. 16, 1997

[54] FIBER OPTIC SENSING SYSTEMS AND METHODS INCLUDING CONTIGUOUS OPTICAL CAVITIES

[75] Inventor: John H. Belk, St. Louis, Mo.

[73] Assignee: McDonnell Douglas Corporation, St. Louis, Mo.

[21] Appl. No.: 475,948

[22] Filed: Jun. 7, 1995

[51] Int. Cl.$^6$ .................................................. H01J 5/16
[52] U.S. Cl. .................. 250/227.11; 250/227.14; 340/555
[58] Field of Search ............... 250/227.11, 227.14, 250/227.16, 227.18, 227.23; 356/352, 345, 32–35, 35.5; 372/102, 105; 340/555–557

[56] References Cited

U.S. PATENT DOCUMENTS

| | | | |
|---|---|---|---|
| 4,733,561 | 3/1988 | Gilby | 356/352 |
| 4,933,545 | 6/1990 | Saaski et al. | 250/227.14 |
| 5,451,772 | 9/1995 | Narendran | 356/352 |

FOREIGN PATENT DOCUMENTS

| | | |
|---|---|---|
| 2 202 046 | 9/1988 | United Kingdom. |
| WO92/06358 | 3/1992 | WIPO. |

OTHER PUBLICATIONS

Lee et al., Optical fiber Fabry–Perot embedded sensor, *Optics Letters*, vol. 14, No. 21 (Nov. 1, 1989), pp. 1225–1227.

Haake et al., Development of a fiberoptic interferometer demodulation/multiplexing system using an active z × 10 photonic polarization preserving fiber coupler, *SPIE*, vol. 1918, Smart Sensing, Processing, and Instrumentation (1993), pp. 237–247, Jan. 1993.

International Search Report, PCT/US96/15012, mailed Jun. 18, 1997.

*Primary Examiner*—Que Le
*Attorney, Agent, or Firm*—Bell Seltzer Intellectual Property Law Group of Alston & Bird LLP

[57] ABSTRACT

A fiber optic sensing system and method comprises a continuous optical fiber including at least three mirrors defining at least two contiguous optical cavities. Preferably, each optical cavity has a unique length so that the reflected optical signal associated with a given optical cavity will have a unique phase difference or wavelength allowing each of the respective optical signals to be selectively detected. A physical phenomenon acting on a given optical cavity can be sensed by determining changes in the respective optical signal reflected from that optical cavity. This sensing system allows a single optical fiber to include both integrating and point sensors. In addition, this system can be incorporated in smart structures.

34 Claims, 3 Drawing Sheets

FIBER OPTIC SENSING SYSTEMS AND METHODS INCLUDING CONTIGUOUS OPTICAL CAVITIES

GOVERNMENT RIGHTS

The United States Government has rights in this invention pursuant to a contract awarded by the Department of the Navy.

FIELD OF THE INVENTION

This invention relates generally to fiber optic sensors and more particularly to a continuous optical fiber including a plurality of sensors.

BACKGROUND OF THE INVENTION

Fiber optic sensors are employed in a variety of applications due, at least in part, to their sensitivity. More particularly, interferometric fiber optic sensors in which the velocity, phase or wavelength of the propagating light is modified in response to sensed phenomena are employed in a variety of applications. For example, optical fiber gyroscopes are commonly employed to measure rotation rates, such as the rotation rate of an aircraft.

By varying the construction of the fiber optic sensor, a fiber optic sensor can be used to detect a variety of physical phenomena, including acoustic, magnetic, and electric energy. In addition to these physical phenomena, it is oftentimes desirable to measure the strain imparted to a workpiece, the temperature to which a workpiece is subjected, or vibrations in a workpiece.

For example, one emerging application in which fiber optic sensors are desirably employed is "smart structures". As known to those having skill in the art, smart structures generally refer to structures, such as composite structures, which incorporate interactive electrical devices for monitoring or actively controlling the performance or behavior of the smart structure. For example, a smart structure can include an electroceramic actuator which induces vibrations within the smart structure to damp or offset externally induced vibrations in the smart structure.

In order to monitor the conditions to which a smart structure is subjected, it is desirable to include a sensor, such as a fiber optic sensor, within the smart structure. For example, the fiber optic sensor can be embedded within the plies of the composite structure or workpiece, such as a carbon-epoxy composite structure, so as to determine the strain or temperature to which the workpiece is subjected. These embedded sensors can be used to monitor the structural integrity and load response of the composite structure in order to preform real-time fatigue monitoring and analysis. These embedded sensors can be employed, for example, in the hull of a submarine, the wing of an airplane, or the exterior of a spacecraft.

In order to measure the strain imparted to a workpiece or the temperature to which a workpiece is subjected, a variety of fiber optic sensors have been developed, including fiber optic sensors designed to be embedded within smart structures. Fiber optic sensors have advantages over conventional sensors in that they are immune to electromagnetic interference, are able to operate in hostile environments, and are highly sensitive.

For example, the publication by Lee et al. entitled "Optical-Fiber Fabry-Perot Embedded Sensor" discusses a reflectively monitored optical-fiber Fabry-Perot interferometer which was embedded in a graphiteepoxy composite material. OPTICS LETTERS, Vol. 14, No. 21, pp. 1225–27, Nov. 1, 1989. A reflectively monitored sensor in the Fabry-Perot configuration has been used to measure temperature changes that occur over a 1.5 mm length of fiber between two mirrors. Such an embedded sensor provides point sensing capability and the potential for submillidegree sensitivity. Because these mirrored fibers have good mechanical properties, and can survive temperatures above 1000 degrees Centigrade, they are candidates to withstand the thermal and mechanical stresses that occur during the formation of composite structures.

The publication by Haake et al. entitled "Development Of A Fiberoptic Interferometer Demodulation/Multiplexing System Using An Active 1×10 Photonic Polarization Preserving Fiber Coupler" discusses an integrated phase modulator/signal multiplexer that can be used to demodulate a fiberoptic interferometer's output. In particular, a monolithically integrated active 1×10 photonic polarization preserving fiber coupler with active waveguides is discussed. Because this device is an active semiconductor optical amplifier, it overcomes splitting losses by the optical gain. A 1 cm Fabry-Perot cavity was formed by fusion splicing a partially reflective coated fiberoptic with an uncoated fiber optic, and by cleaving the fiber a centimeter away from the intrinsic mirror. Three Fabry-Perot fiberoptic sensors were coupled to the 1×10 active photonics device.

These systems may, however, require a separate point of ingress or egress for each sensor to be embedded in a composite structure because each sensor is formed from a separate fiber, and these points of ingress and egress may detrimentally affect the strength of the composite structure being manufactured. Accordingly, there continues to exist a need in the art for fiber optic sensors capable of monitoring a plurality of physical phenomena without increasing the number of points of ingress and egress.

SUMMARY OF THE INVENTION

It is therefor an object of the present invention to provide an improved fiber optic sensor for detecting a plurality of physical phenomena imparted to a workpiece.

It is another object of the present invention to provide a fiber optic sensor which does not require separate points of ingress or egress for each sensor.

These and other objects according to the present invention are provided by a fiber optic sensing system including a continuous optical fiber having a plurality of mirrors which partially reflect and partially transmit light passing through the optical fiber. Three consecutive mirrors define two contiguous optical cavities such that the reflections from the first and second mirrors defining the first optical cavity generate a first reflected optical signal having a first characteristic, and the reflections from the second and third mirrors defining the second optical cavity generate a second reflected optical signal having a second characteristic. The first and second characteristics may be first and second phase differences (e.g., Fabry-Perot), or first and second wavelengths (e.g. Bragg grating).

Each space between two mirrors defines an optical cavity which can be used as a separate sensor, allowing a single optical fiber to act as a plurality of sensors. Accordingly, a single optical fiber can be provided on a workpiece, such as a composite structure, and used to sense a plurality of phenomena acting on the workpiece. By having contiguous optical cavities, the number of sensors along a single optical fiber can be increased.

Optical cavities having a relatively short distance between consecutive mirrors can be used as point sensors to measure, for example, strain, temperature, or relatively high frequency acoustic energy at discrete points on the workpiece. Optical cavities having a relatively long distance between consecutive mirrors can be used as integrating sensors to measure, for example, average temperature, average strain, vibrations, or relatively low frequency acoustic energy distributed along the length of workpiece adjacent the optical cavity.

The continuous optical fiber can be placed on or in a workpiece such as a composite structure in order to provide a plurality of sensors for monitoring the composite structure. The composite structure can be a carbon epoxy composite structure used to form, for example, the hull of a submarine, an airplane wing, or components of a spacecraft, and these structures are also known as smart structures. In these applications, the optical fiber can be placed between layers during the manufacture of the composite structure. Accordingly, multiple sensors can be provided on the structure while requiring only one point of ingress or egress through the structure for access to the plurality of sensors. By reducing the number of optical fibers required, the strength of the structure is not substantially affected.

According to one embodiment of the present invention, a fiber optic sensing system includes a continuous optical fiber having at least three consecutive mirrors defined at predetermined positions, and an optical signal passing through the continuous optical fiber is partially reflected and partially transmitted by each of the mirrors. The first and second mirrors define a first optical cavity having a first predetermined length, and the second and third mirrors define a second optical cavity having a second predetermined length different from the first predetermined length. Accordingly, the first and second optical cavities are contiguous optical cavities, and first and second optical signals are respectively reflected from the first and second optical cavities.

The first reflected optical signal has a first predetermined characteristic corresponding to the length of the first optical cavity, and the second reflected optical signal has a second predetermined characteristic corresponding to the length of the second optical cavity. The first and second predetermined characteristics may be first and second predetermined phase differences or wavelengths. In addition, an optical source is coupled to the optical fiber. This optical source produces optical signals of a predetermined wavelength which are transmitted through the optical fiber.

The fiber optic sensing system also includes a contiguous optical cavity signal demodulator coupled to the optical fiber. The demodulator selectively detects the optical signals reflected by the consecutive mirrors defining the contiguous optical cavities based on differences between the respective characteristics. The demodulator also determines a magnitude of the predetermined phenomena to which the workpiece is subjected based upon changes in the selectively detected optical signals reflected from the contiguous optical cavities.

In this sensing system, the first optical cavity may have a length that is at least six times longer than the length of the second optical cavity. Accordingly, the first optical cavity can be used as an integrating sensor to sense phenomena acting along the length of the optical cavity such as average temperature, average strain, vibrations, or relatively low frequency acoustic energy. In contrast, the second optical cavity can be used as a point sensor to sense phenomena at discrete points such as temperature, strain, and relatively high frequency acoustic energy. Where long optical cavities are included on the optical fiber, the demodulator may include a fiber optic delay leg in order to delay a portion of the reflected optical signals.

The contiguous optical cavity signal demodulator may digitize the reflected optical signals, and perform a Fourier transform on the digitized signal to produce a spectrum having a peak for each optical cavity wherein each of the peaks includes a phase reading. The phase reading can then be interpreted to determine the magnitude of the predetermined phenomena. These functions can be carried out on a general purpose computer, a special purpose computer, special purpose hardware, or combinations thereof, as known to those having skill in the art.

The mirrors of this fiber optic sensing system may comprise a reflective non-glass material inserted in the optical fiber, and the reflective non-glass material may comprise titanium dioxide. The fiber optic sensor may also include a third optical cavity contiguous with the second optical cavity such that a third reflected optical signal having a third predetermined wavelength is reflected from the third optical cavity. In fact any number of optical cavities may be defined along the continuous optical fiber as long as each cavity has a unique length such that the demodulator can distinguish the reflected optical signal of each cavity.

In another embodiment, a fiber optic sensing system includes a continuous optical fiber comprising at least one point sensor and at least one integrating (or distributed) sensor. The point sensor allows sensing of a first physical phenomenon at a discrete point on the workpiece, while the integrating (or distributed) sensor allows sensing of a second physical phenomenon distributed along a portion of the workpiece.

This sensing system also includes an optical source, coupled to the continuous optical fiber, for producing optical signals of a predetermined wavelength to be transmitted through the continuous optical fiber. A first optical signal reflected from the point sensor has a first predetermined characteristic, and a second optical signal reflected from the integrating sensor has a second predetermined characteristic. The first and second predetermined characteristics may be first and second predetermined phase differences or first and second predetermined wavelengths.

In addition, this sensing system includes a demodulator coupled to the continuous optical fiber for selectively detecting the first and second reflected optical signals as respectively reflected from the point and integrating sensors based on differences between the respective characteristics of the reflected optical signals. The demodulator also determines respective magnitudes for the first and second phenomenon to which the workpiece is subjected based upon the selectively detected optical signals reflected from the point and integrating sensors.

In this system, the point sensor and the integrating sensor may each comprise an optical cavity defined by a pair of mirrors in the continuous optical fiber. Each of these optical cavities has a predetermined length defined by the distance between the respective pair of mirrors. Furthermore, the length of the point sensor optical cavity is preferably short relative to the predetermined length of the integrating sensor. In fact, the predetermined length of the integrating sensor may be at least six times the predetermined length of the point sensor.

In addition, the point sensor and the integrating sensor may be contiguous such that a first and second mirror define the point sensor optical cavity, and the second mirror and a third mirror define the integrating sensor optical cavity. Furthermore, each of the mirrors may comprise a reflective non-glass material inserted in the optical fiber.

The fiber optic sensors of the present invention allow the placement of a plurality of sensors in composite structures such as airplane wings and submarine hulls without significantly degrading their strength because only one point of ingress or egress is required for the single optical fiber including the plurality of sensors. These sensors can be used to sense a plurality of physical phenomena such as temperature, strain, acoustic energy, and vibrations. In addition, point sensors can be used to sense physical phenomena at discrete points while integrating sensors can be used to sense physical phenomena distributed along a length of a surface.

DETAILED DESCRIPTION OF THE PREFERRED EMBODIMENT

The present invention will now be described more fully hereinafter with reference to the accompanying drawings, in which a preferred embodiment of the present invention is shown. This invention may, however, be embodied in many different forms and should not be construed as limited to the embodiment set forth herein; rather, this embodiment is provided so that this disclosure will be thorough and complete and will fully convey the scope of the invention to those skilled in the art. Like numbers refer to like elements throughout.

Figure 1:
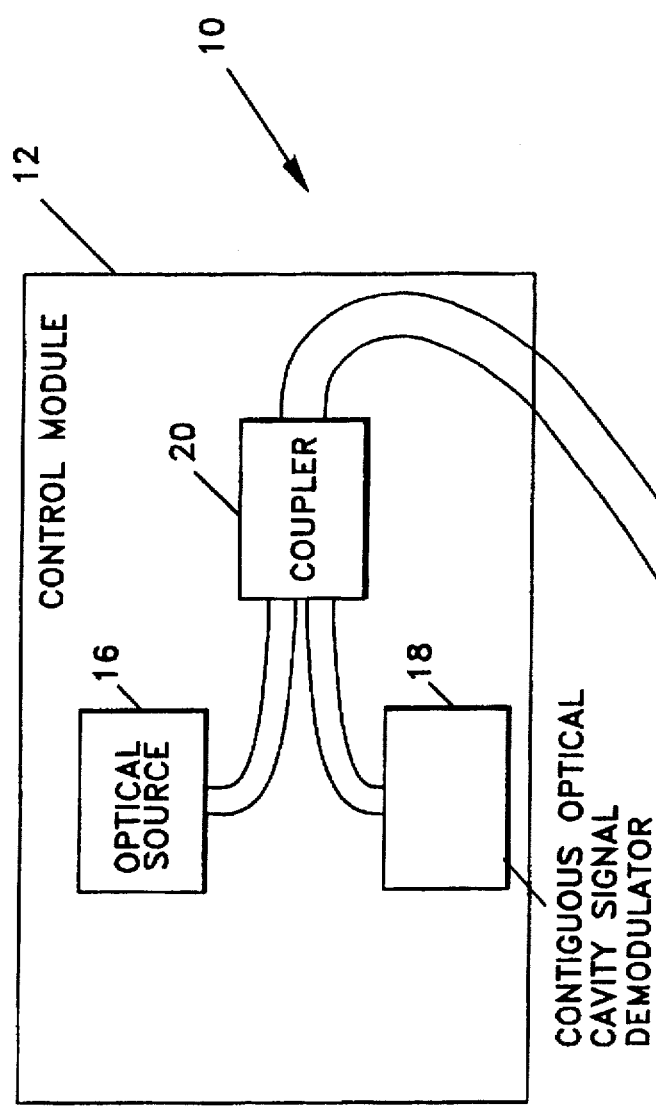
FIG. 1 is a schematic representation of a fiber optic sensing system including contiguous optical cavities according to the present invention.
Figure 1:
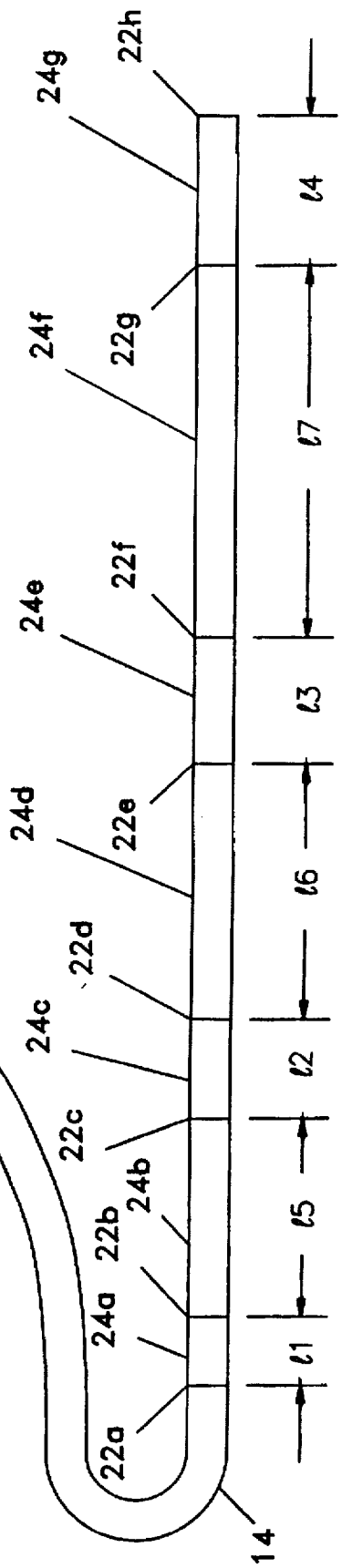

As shown in FIG. 1, the sensing system 10 of the present invention includes a control module 12 and a continuous optical fiber 14. The control module 12 includes an optical source 16, such as a semiconductor laser; a contiguous optical cavity signal demodulator 18; and a coupler 20. The continuous optical fiber 14 includes a plurality of mirrors 22a–h defining a plurality of contiguous optical cavities 24a–g therebetween.

The optical source 16 is coupled to the continuous optical fiber 14 through a conventional coupler 20, as will be understood by those having skill in the art. The optical source produces optical signals of a predetermined wavelength, and these signals are transmitted through the continuous optical fiber 14. This optical signal is partially transmitted through and partially reflected by each of the plurality of mirrors 22a–h along the continuous optical fiber 14. These reflections are transmitted back through the coupler 20 to the contiguous optical cavity signal demodulator 18. In addition, the coherence of the optical source is preferably at least two times the length of the longest optical cavity.

The mirrors can be formed from a reflective non-glass material, such as titanium dioxide ($TiO_2$), which is inserted in the optical fiber. For example, two single mode fibers, one of which is coated on the end with a $TiO_2$ film can be joined by fusion splicing to form a mirror. The splicing unit is operated at lower arc current and duration than for a normal splicing process. Several splicing pulses can be used to obtain a reflectance in the 1–2% range. See, Lee et al., "Optical-Fiber Fabry-Perot Embedded Sensor," OPTICS LETTERS, Vol. 14, No. 21, pp. 1225–27, Nov. 1, 1989. The last mirror 22h along the fiber can be formed by the splicing technique described above, or by cleaving the fiber.

Each pair of adjacent mirrors defines an optical cavity 24a–24g, and a single mirror can be used to define the end of one optical cavity and the beginning of the next optical cavity. (In addition, pairs of non-adjacent mirrors also define optical cavities.) Accordingly, the optical fiber can include contiguous optical cavities. The use of contiguous optical cavities can increase the number of sensors provided by an optical fiber having a predetermined length. The length 11-17 of each optical cavity is defined by the distance between the two mirrors defining that optical cavity.

The two mirrors defining each optical cavity reflect optical signals back to the contiguous optical cavity signal demodulator, and these two reflected signals interfere with one another to produce a reflected optical signal. The reflected optical signal for a given optical cavity has a phase difference or wavelength corresponding to the length 1 (distance between the mirrors) of that optical cavity. By making the length of each optical cavity unique, the phase difference or wavelength of each of the respective reflected optical signals will be unique allowing the signal from each optical cavity to be distinguished by the contiguous optical cavity signal demodulator.

The fiber optic sensing system of FIG. 1 includes four optical cavities 24a,c,e,g having a relatively short length 11-4 and three optical cavities 24b,d,f having a relatively long length 15-7. Furthermore, each of the optical cavities has a unique length such that, 11<12<13<14<<15<16<17. The phase difference of the two reflected optical signals is dependent on the spacing of the mirrors. Accordingly, the contiguous optical cavity signal demodulator can distinguish the optical signal generated by each of the optical cavities.

As discussed above, because each optical cavity has a different length, each has its own characteristic phase difference or wavelength. This encoding by frequency allows the signals from each sensor to be detected separately by the demodulator through band-pass filtering. This band-pass filtering can be accomplished by digitizing the reflected optical signals and Fourier transforming these digitized signals on a computer using a Fast Fourier Transform (FFT) algorithm. The resulting spectrum will have a peak for each optical cavity, and each peak will include amplitude and phase readings. The phase reading for each optical cavity will correspond to the physical phenomenon (i.e. strain or temperature) acting on that cavity.

Because the optical properties and length of the fiber change as the fiber is subjected to strain or changes in temperature, an optical cavity can be used to sense physical phenomena. Stated in other words, if the portion of the optical fiber at an optical cavity is subjected to changes in temperature or strain, the phase of the respective reflected optical signal will also change. These changes in phase can be monitored by the demodulator in order to monitor the desired phenomenon.

The lengths 11-7 of the optical cavities illustrated in FIG. 1 can be: 11=10 mm; 12=17 mm; 13=24 mm; 14=31 mm; 15=1.7 m; 16=2.7 m; and 17=3.7 m. Accordingly, optical cavities 24a,c,e,g are adapted for use as point sensors. That is, each of these sensors will span a relatively short distance over the respective portion of the workpiece to be monitored, effectively sensing a discrete point on the workpiece. Accordingly, physical phenomena such as temperature, strain or relatively high frequency acoustic energy can be sensed at a discrete point on a workpiece to which one of these relatively short optical cavities is attached.

Furthermore, these differences between lengths of the optical cavities are sufficient to ensure that the phase difference or wavelength of each respective reflected optical signal is sufficiently unique to be identified by the contiguous optical cavity signal demodulator 18. The Fast Fourier Transform generated by the demodulator can be set to a first scale to generate the output illustrated in FIG. 2. Each peak represents a reflected optical signal corresponding to one of the relatively short optical cavities, and changes in the phase readings can be used to sense changes in the sensor.

Optical cavities 24b,d,f having relatively long lengths, are adapted to sense physical phenomena such as average temperature, average strain, vibrations, and relatively low frequency acoustic energy acting over the portion of the workpiece over which the length of the optical cavity is applied. Accordingly, these relatively long (or integrating) optical cavities integrate sensed phenomena over the length of the sensor. The differences in length are sufficient to distinguish the respective reflected optical signals, and the Fast Fourier Transform generated by the demodulator can be set to a second scale to generate the output illustrated in FIG. 3. Again, each peak represents a reflected optical signal corresponding to one of the relatively long (integrating) optical cavities, and changes in the phase readings can be used to sense changes in the sensor.

Figure 2:
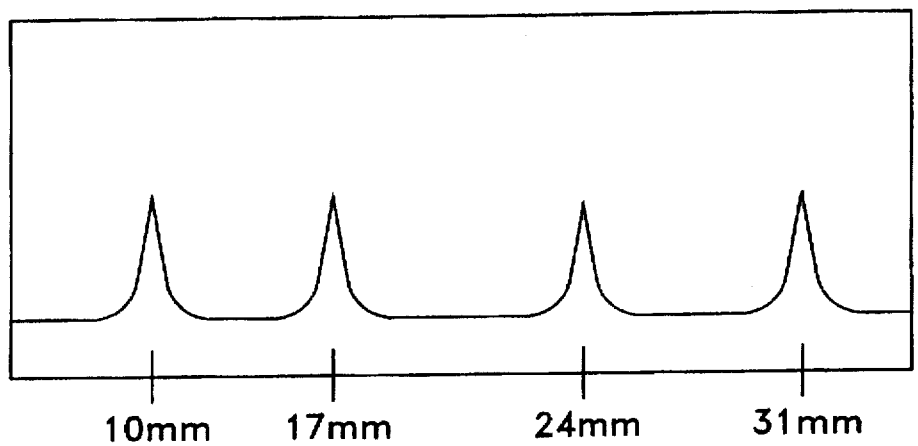
FIGS. 2–4 illustrate Fourier transform spectrums including peaks for respective optical cavities of the sensing system of FIG. 1.
Figure 3:
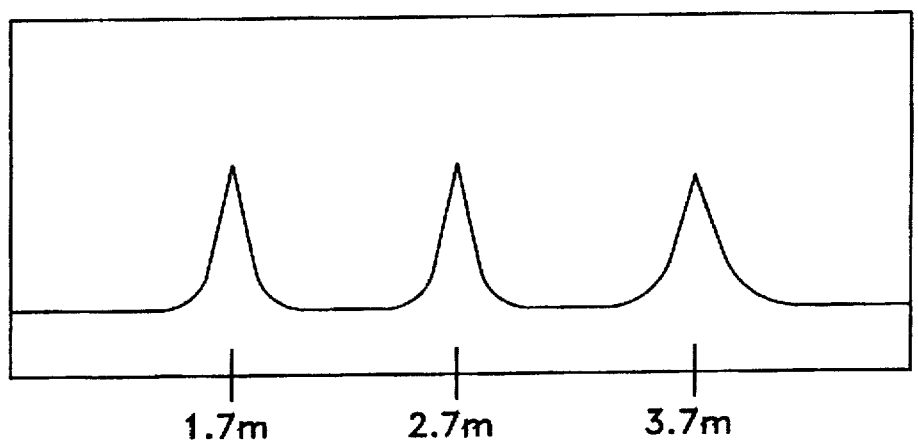
Figure 4:
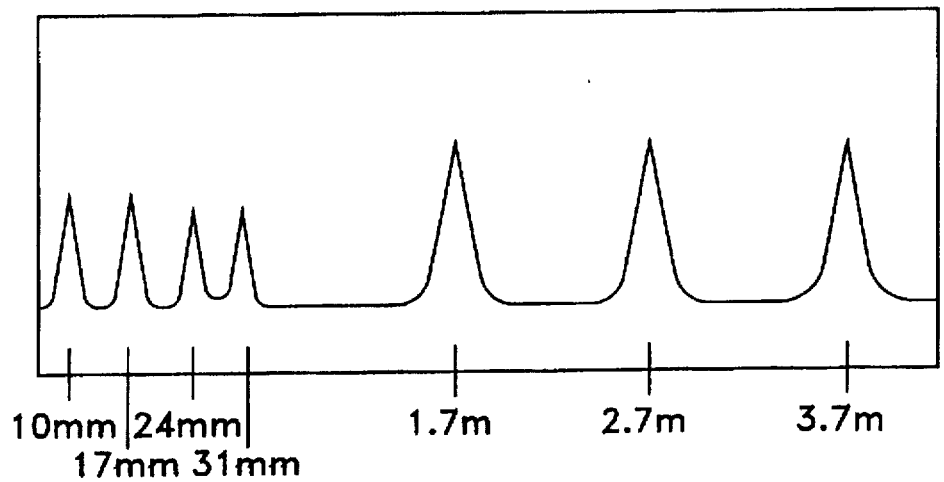

While FIGS. 2 and 3 show that different scales can be used to alternately monitor reflected optical signals from relatively short and long optical cavities, it may be desirable to monitor both types of reflected optical signals at once. Accordingly, a single scale can be used as shown in FIG. 4. In addition, the optical fiber 14 can include any number of optical cavities in any arrangement. For example, the fiber can include contiguous relatively short optical cavities, or contiguous relatively long optical cavities. Furthermore, a length of the fiber not intended as a sensor can be used to separate first and second pluralities of contiguous optical cavities on a single continuous optical fiber.

The contiguous optical cavity signal demodulator 18 may also comprise any of a number of demodulation systems including but not limited to an Acousto-Optic Tunable Filter, a Fabry-Perot Etalon Tracking System, or a Chirped Laser/Fourier Analyzer. These systems may be implemented using software executed on either a general purpose computer or a special purpose computer, using special purpose hardware, or using combinations thereof. In addition, the demodulator can include a fiber optic delay leg for each of the relatively long optical cavities. For each relatively long optical cavity, the respective fiber optic delay leg is approximately equal to twice the length of the optical cavity (21) in order to match the reflections from the two mirrors of the optical cavity.

Figure 5:
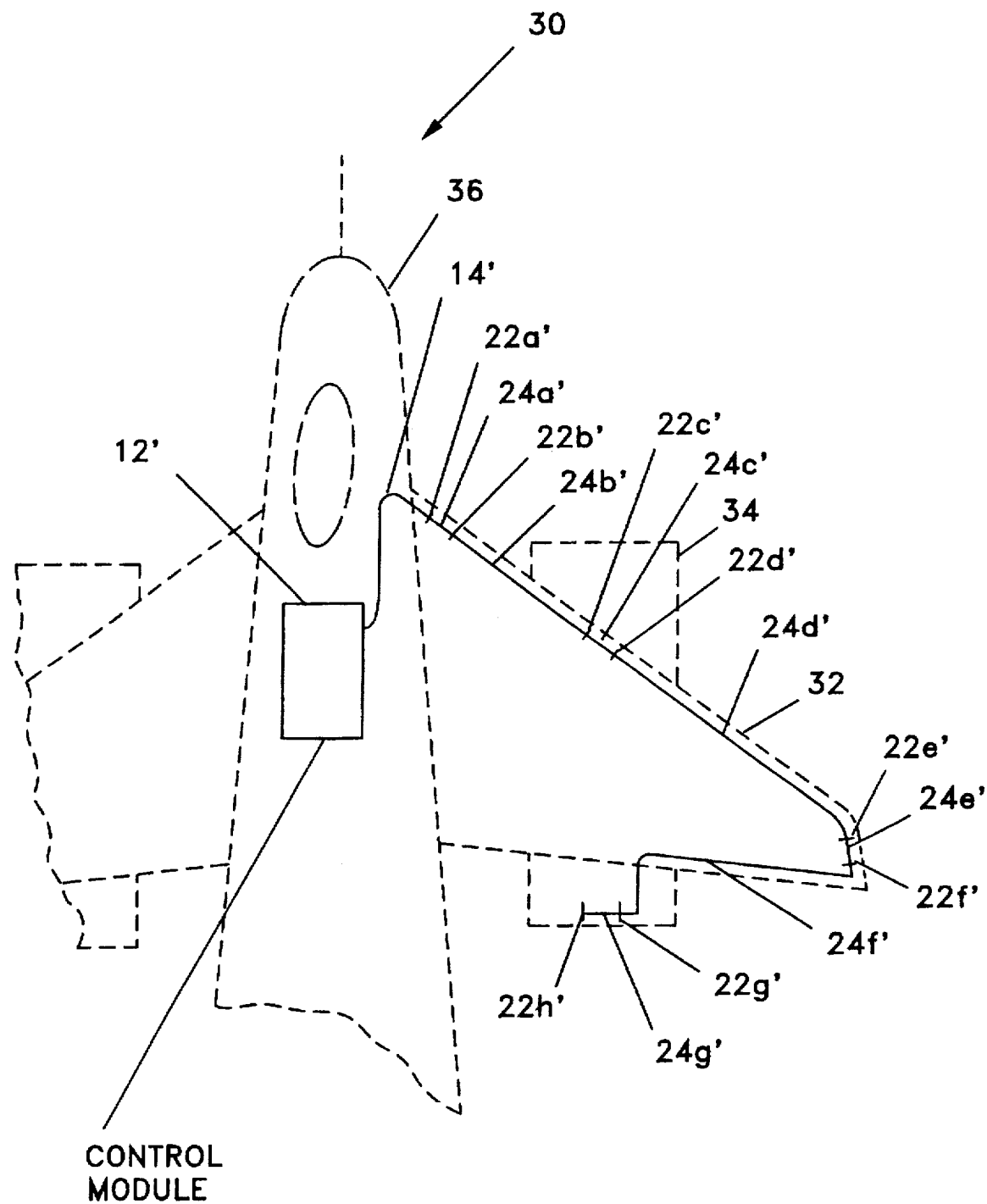
FIG. 5 illustrates the application of the fiber optic sensing system of FIG. 1 to the wing of an airplane.

As shown in FIG. 5, the fiber optic sensing system of FIG. 1 can be used to monitor a workpiece such as the wing 32 of an airplane 30. As before, the fiber optic sensing system includes a control module 12' and a continuous optical fiber 14' with a plurality of mirrors 22a–h' defining contiguous optical cavities 24a–g'. As before, optical cavities 24a,c,e,g' are relatively short, while optical cavities 24b,d,f are relatively long, and each optical cavity has a unique length.

The wing 32 can be fabricated so as to include the continuous optical fiber 14'. For example, the wing can be formed from a plurality of laminated graphite-epoxy panels such that the continuous optical fiber is sandwiched therein. By providing multiple sensors on a single optical fiber, the effect on the strength of the wing is reduced. Furthermore, the use of contiguous optical cavities increases the number of sensors that can be provided by the continuous fiber.

As shown in FIG. 5, the relatively short optical cavities are used as point sensors and can be placed at critical points in the wing to sense strain or temperature. For example, optical cavity 24a' can be used to sense strain where the wing joins the fuselage; optical cavity 24c' can be used to sense strain where the jet engine 34 joins the wing 32; optical cavity 24e' can be used to sense strain between layers of the carbon epoxy at the wing tip; and optical cavity 24g' can be used to sense the temperature at the jet exhaust. Point sensors can also be used to sense high frequency acoustic energy in the wing or other physical phenomena at a relatively discrete point.

Similarly, the relatively long optical cavities are used as integrating sensors, and can be used to sense average temperature, average strain, vibrations, or other physical phenomena distributed along the respective sensor. For example, optical cavity 24b' can be used to sense the average strain experienced by the wing between the fuselage 36 and the jet engine 34; optical cavity 24d' can be used to sense the average temperature along the leading edge of the wing; and optical cavity 24f' can be used to sense vibrations along the trailing edge of the wing. In addition, relatively long optical cavities can be used to sense relatively low frequency acoustic energy transmitted through the wing.

The wing 32 of FIG. 5 is merely representative of a smart structure including the fiber optic sensing system of the present invention. Another smart structure application includes, for example, a submarine hull. Furthermore, very long coiled optical cavities (on the order of 100 m) can be used to sense sonar energy. Accordingly, a single optical fiber can be used to sense strains, temperatures, and vibrations on the hull of a submarine, as well as sonar energy. This has the advantage that only one point of ingress or egress through the hull is required for all of these sensors. The contiguous optical cavities of the present invention can also be used to sense large displacements, to provide feedback control for noise, and as a low frequency earthquake warning system.

The fiber optic sensing systems and methods of the present invention allow the placement of a plurality of sensors in composite structures such as airplane wings and submarine hulls without significantly degrading their strength because only one point of ingress or egress is required for the single optical fiber including the plurality of sensors. These sensors can be used to sense a plurality of physical phenomena such as temperature, strain, acoustic energy, and vibrations. In addition, point sensors can be used to sense physical phenomena at discrete points while integrating sensors can be used to sense physical phenomena distributed along a length of a surface.

In the drawings and specification, there has been set forth a preferred embodiment of the invention, and although specific terms are employed, the terms are used in a generic and descriptive sense only and not for the purpose of limitation, the scope of the invention being set forth in the following claims.

That which is claimed is:

1. A fiber optic sensing system for detecting a predetermined phenomena to which a workpiece is subjected, the fiber optic sensing system comprising:

a continuous optical fiber having at least three mirrors defined at predetermined spaced apart positions, wherein an optical signal passing through said continuous optical fiber is at least partially reflected by each of said mirrors, wherein said first and second mirrors define a first optical cavity having a first predetermined length and said second and third mirrors define a second optical cavity having a second predetermined length different from said first predetermined length, wherein said first and second optical cavities are contiguous optical cavities separated by said second mirror which defines end portions of both said first and second optical cavities, and wherein the predetermined positions of said mirrors are selected such that said first and second optical cavities preferentially reflect first and second optical signals, respectively, having first and second predetermined characteristics, respectively, corresponding to the predetermined lengths of said respective optical cavities;

an optical source, coupled to said optical fiber, for producing optical signals of a predetermined wavelength to be transmitted through said optical fiber; and a contiguous optical cavity signal demodulator coupled to said optical fiber, which selectively detects the optical signals reflected by said mirrors defining said contiguous optical cavities based upon differences between respective characteristics of said reflected optical signals, and which determines a magnitude of the predetermined phenomena to which the workpiece is subjected based on said selectively detected optical signals reflected from said contiguous optical cavities.

2. A fiber optic sensing system according to claim 1 wherein said first predetermined length is at least six times said second predetermined length.

3. A fiber optic sensing system according to claim 2 wherein said demodulator comprises a fiber optic delay leg.

4. A fiber optic sensing system according to claim 2 wherein said first optical cavity is an integrating sensor for detecting a first predetermined phenomenon acting along a length of said first optical cavity and said second optical cavity is a point sensor for detecting a second predetermined phenomenon acting at a discrete point.

5. A fiber optic sensing system according to claim 1 wherein said contiguous optical cavity signal demodulator comprises:

digitizing means for digitizing said reflected optical signals to produce a digital signal representative of said reflected optical signals;

transforming means for Fourier transforming said digital signal to produce a spectrum having a peak for each optical cavity wherein each of said peaks includes a phase reading; and interpreting means for interpreting said phase readings to determine a magnitude of the predetermined phenomena.

6. A fiber optic sensing system according to claim 1 wherein said first contiguous optical cavity and said first reflected optical signal having said first predetermined characteristic are responsive to a first predetermined phenomenon to which the workpiece is subjected, and wherein said second contiguous optical cavity and said second reflected optical signal having said second predetermined characteristic are responsive to a second predetermined phenomenon to which the workpiece is subjected.

7. A fiber optic sensing system according to claim 1 wherein each of said mirrors comprises a reflective nonglass material inserted in the optical fiber.

8. A fiber optic sensing system according to claim 7 wherein said reflective non-glass material comprises titanium dioxide.

9. A fiber optic sensing system according to claim 1 wherein said continuous optical fiber comprises at least four consecutive mirrors defined at predetermined positions, wherein said third and fourth mirrors define a third optical cavity of a third predetermined length, each of said predetermined lengths being different and said second and third optical cavities being contiguous optical cavities, such that a third reflected optical signal having a third predetermined characteristic is reflected from said third optical cavity.

10. A fiber optic sensing system according to claim 1 wherein said optical signal passing through said continuous optical fiber is partially transmitted and partially reflected by said first and second mirrors.

11. A fiber optic sensing system according to claim 1 wherein said first and second predetermined characteristics comprise first and second predetermined phase differences.

12. A fiber optic sensing system according to claim 1 wherein said first and second predetermined characteristics comprise first and second predetermined wavelengths.

13. A fiber optic sensing method for detecting a predetermined phenomena to which a workpiece is subjected, the fiber optic sensing method comprising the steps of:

providing a continuous optical fiber having at least three mirrors defined at predetermined spaced apart positions, wherein said first and second mirrors define a first optical cavity of a first predetermined length and said second and third mirrors define a second optical cavity of a second predetermined length different from said first predetermined length such that the first and second optical cavities are contiguous and are separated by said second mirror which defines end portions of both said first and second optical cavities;

transmitting an optical signal having a predetermined wavelength through said continuous optical fiber such that said optical signal is at least partially reflected by each of said mirrors to thereby produce a first reflected optical signal having a first predetermined characteristic corresponding to said first predetermined length of said first optical cavity and a second reflected optical signal having a second predetermined characteristic corresponding to said second predetermined length of said second optical cavity;

selectively detecting said first and second optical signals reflected from said contiguous optical cavities based on differences between said respective characteristics of said reflected optical signals; and determining a magnitude of the predetermined phenomena to which the workpiece is subjected based upon changes in said optical signals reflected from said contiguous optical cavities.

14. A fiber optic sensing method according to claim 13 wherein said step of selectively detecting said optical signals reflected from said contiguous optical cavities further comprises digitizing said reflected optical signals to produce a digital signal representative of said reflected optical signals and Fourier transforming said digital signal to produce a spectrum having a peak for each optical cavity wherein each of said peaks includes a phase reading, and wherein said step of determining a magnitude of the predetermined phenomenon comprises the step of interpreting said phase readings to determine a magnitude of the predetermined phenomena.

15. A fiber optic sensing method according to claim 13 wherein said detecting step further comprises the step of delaying a portion of said reflected optical signals for a period of time approximately equal to twice that required for said optical signal to travel one way through one of said optical cavities.

16. A fiber optic sensing method according to claim 13 wherein said optical signal is partially reflected and partially transmitted by said first and second mirrors.

17. A fiber optic sensing method according to claim 13 wherein said first and second predetermined characteristics comprise first and second predetermined phase differences.

18. A fiber optic sensing method according to claim 13 wherein said first and second predetermined characteristics comprise first and second predetermined wavelengths.

19. A smart structure comprising:

a structure which is subject to physical phenomena including at least one of strain, temperature variations, vibrations, and acoustic energy;

a continuous optical fiber embedded in said structure and having at least three mirrors defined at predetermined spaced apart positions wherein an optical signal passing through said continuous optical fiber is at least partially reflected by each of said mirrors, wherein said first and second mirrors define a first optical cavity having a predetermined length and said second and third mirrors define a second optical cavity having a second predetermined length different from said first predetermined length, wherein said first and second optical cavities are contiguous optical cavities separated by said second mirror which defines end portions of both said first and second optical cavities, wherein the predetermined positions of said mirrors are selected such that said first and second optical cavities preferentially reflect first and second optical signals, respectively, having first and second predetermined characteristics, respectively, corresponding to the predetermined lengths of said respective optical cavities;

an optical source, coupled to said optical fiber, for producing optical signals of a predetermined wavelength to be transmitted through said optical fiber; and a contiguous optical cavity signal demodulator coupled to said optical fiber, which selectively detects the optical signals reflected by said mirrors defining said first and second contiguous optical cavities based upon differences between respective characteristics of said optical signals reflected from said contiguous optical cavities, and which determines a magnitude of the predetermined phenomena to which said structure is subjected based on said selectively detected optical signals reflected from said contiguous optical cavities.

20. A smart structure according to claim 19 wherein one of said first and second predetermined lengths is at least six times longer than another.

21. A smart structure according to claim 19 wherein said first contiguous optical cavity and said first reflected optical signal having said first predetermined characteristic are responsive to a first predetermined phenomenon to which said structure is subjected, and said second contiguous optical cavity and said second reflected optical signal having said second predetermined characteristic are responsive to a second predetermined phenomenon to which said structure is subjected.

22. A smart structure according to claim 19 wherein said contiguous optical cavity demodulator comprises a fiber optic delay leg.

23. A smart structure according to claim 19 wherein each of said mirrors comprises a reflective non-glass material inserted in said continuous optical fiber.

24. A smart structure according to claim 23 wherein said reflective non-glass material comprises titanium dioxide.

25. A smart structure according to claim 19 wherein said contiguous optical cavity signal demodulator comprises:

digitizing means for digitizing said reflected optical signals to produce a digital signal representative of said reflected optical signals;

transforming means for Fourier transforming said digital signal to produce a spectrum having a peak for each optical cavity wherein each of said peaks includes a phase reading; and interpreting means for interpreting said phase readings to determine a magnitude of the predetermined phenomena.

26. A smart structure according to claim 19 wherein said optical signal passing through said continuous optical fiber is partially reflected and partially transmitted by said first and second mirrors.

27. A smart structure according to claim 19 wherein said first and second predetermined characteristics comprise first and second predetermined phase differences.

28. A smart structure according to claim 19 wherein said first and second predetermined characteristics comprise first and second predetermined wavelengths.

29. A fiber optic sensing system for detecting a predetermined phenomena to which a workpiece is subjected, the fiber optic sensing system comprising:

a continuous optical fiber comprising at least one point sensor for detecting a first physical phenomenon at a discrete point on the workpiece and at least one integrating sensor for detecting a second physical phenomenon distributed along a portion of the workpiece, wherein said at least one point sensor and said at least one integrating sensor each comprise a respective optical cavity of a predetermined length defined between a pair of mirrors, and wherein the predetermined length of said at least one integrating sensor is at least six times greater than the predetermined length of said at least one point sensor;

an optical source, coupled to said continuous optical fiber, for producing optical signals of a predetermined wavelength to be transmitted through said continuous optical fiber, such that a first reflected optical signal having a first predetermined characteristic and a second reflected optical signal having a second predetermined characteristic are reflected from said point sensor and said integrating sensor, respectively; and a demodulator coupled to said continuous optical fiber which selectively detects said first and second optical signals respectively reflected from said point and integrating sensors based upon differences between respective characteristics of said reflected optical signals, and which determines respective magnitudes of said first and second phenomenon to which the workpiece is subjected based upon said selectively detected optical signals reflected from said point and integrating sensors.

30. A fiber optic sensing system according to claim 29 wherein said demodulating means comprises:

digitizing means for digitizing said reflected optical signals to produce a digital signal representative of said reflected optical signals;

transforming means for Fourier transforming said digital signal to produce a spectrum having a peak for each optical cavity wherein each of said peaks includes a phase reading; and interpreting means for interpreting said phase readings to determine a magnitude of the predetermined phenomena.

31. A fiber optic sensing system according to claim 29 wherein said first and second predetermined characteristics comprise first and second predetermined phase differences.

32. A fiber optic sensing system according to claim 29 wherein said first and second predetermined characteristics comprise first and second predetermined wavelengths.

33. A fiber optic sensing system according to claim 29 wherein said point sensor and said integrating sensor are contiguous such that a first and second mirror define said point sensor optical cavity, and said second mirror and a third mirror define said integrating sensor optical cavity.

34. A fiber optic sensing system according to claim 29 wherein each of said mirrors comprises a reflective non-glass material inserted in said optical fiber.

* * * * *